US010484368B2

(12) United States Patent
Hinohara et al.

(10) Patent No.: US 10,484,368 B2
(45) Date of Patent: Nov. 19, 2019

(54) MANAGEMENT SYSTEM, MANAGEMENT METHOD, AND RECORDING MEDIUM FOR MANAGING USE OF FUNCTION TO TERMINAL

(71) Applicants: Hiroshi Hinohara, Kanagawa (JP); Naoki Umehara, Kanagawa (JP); Takeshi Horiuchi, Tokyo (JP); Atsushi Miyamoto, Kanagawa (JP); Takuya Soneda, Kanagawa (JP)

(72) Inventors: Hiroshi Hinohara, Kanagawa (JP); Naoki Umehara, Kanagawa (JP); Takeshi Horiuchi, Tokyo (JP); Atsushi Miyamoto, Kanagawa (JP); Takuya Soneda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/335,642

(22) Filed: Oct. 27, 2016

(65) Prior Publication Data

US 2017/0142099 A1 May 18, 2017

(30) Foreign Application Priority Data

Nov. 13, 2015 (JP) ................................ 2015-223160

(51) Int. Cl.
*H04L 29/06* (2006.01)

(52) U.S. Cl.
CPC ...... *H04L 63/0853* (2013.01); *H04L 63/0281* (2013.01); *H04L 63/0807* (2013.01); *H04L 63/10* (2013.01)

(58) Field of Classification Search
CPC ..... H04L 63/08; H04L 63/10; H04L 63/0853; H04L 63/0281
See application file for complete search history.

(56) References Cited

U.S. PATENT DOCUMENTS 6,775,783 B1 * 8/2004 Trostle ................. G06F 21/335
 713/185
7,444,676 B1 * 10/2008 Asghari-Kamrani .......
 G06F 21/31
 726/21

(Continued)

FOREIGN PATENT DOCUMENTS

CN 104580063 4/2015
JP 2014-206922 10/2014

(Continued)

OTHER PUBLICATIONS

Sakimura B Kihara N et al: "Structured Access Token for Sharing Authorization Grant between a Resource Server and an Authorization Server; draft-sakimura-oidc-structured-token-01.txt", Structured Access Token for Sharing Authorization Grant Between a Resource Server and an Authorization Server; Draft-Sakimura-OIDC-Structured-Token-01.txt, Internet Engineering Task Force, IETF; Standardworkingdraft, Internet Society (ISOC) 4, Rue De, Feb. 25, 2013 (Feb. 25, 2013), http://tools.ietf.org/html/draft-sakimura-oidc-structured-token-01, pp. 1-12.

(Continued)

*Primary Examiner* — Sher A Khan
(74) *Attorney, Agent, or Firm* — IPUSA, PLLC

(57) ABSTRACT

A management system includes a reception unit configured to receive identification information for identifying an account, allocated by an authentication apparatus, corresponding to a terminal, the terminal being authenticated by the authentication apparatus, and a management unit configured to determine whether a function provided by the management system can be used by the terminal based on the identification information received by the reception unit.

14 Claims, 14 Drawing Sheets

(56) References Cited

U.S. PATENT DOCUMENTS

| | | | | |
|---|---|---|---|---|
| 7,721,326 | B2* | 5/2010 | Bauban | H04L 63/08 713/176 |
| 2003/0115142 | A1* | 6/2003 | Brickell | G06F 21/31 705/51 |
| 2004/0128558 | A1* | 7/2004 | Barrett | G06F 21/33 726/8 |
| 2005/0091338 | A1* | 4/2005 | de la Huerga | A61J 1/1437 709/217 |
| 2006/0050671 | A1* | 3/2006 | Kim | H04L 63/08 370/338 |
| 2007/0056022 | A1* | 3/2007 | Dvir | G06F 21/31 726/4 |
| 2007/0289005 | A1* | 12/2007 | Kumar | H04L 63/08 726/10 |
| 2011/0216699 | A1* | 9/2011 | Umehara | H04L 12/1813 370/328 |
| 2014/0237552 | A1* | 8/2014 | Yoo | H04L 9/3228 726/3 |
| 2015/0222615 | A1* | 8/2015 | Allain | H04L 63/08 726/4 |
| 2015/0237089 | A1 | 8/2015 | Hinohara et al. | |
| 2016/0048937 | A1* | 2/2016 | Mathura | G06Q 40/12 705/30 |
| 2017/0076286 | A1* | 3/2017 | Castinado | G06Q 20/405 |
| 2017/0302645 | A1* | 10/2017 | Ducker | H04L 63/08 |

FOREIGN PATENT DOCUMENTS

| | | |
|---|---|---|
| WO | 2014/180431 | 11/2014 |
| WO | 2015/163396 | 10/2015 |

OTHER PUBLICATIONS

Si Xiong: "Web Single Sign-On System for WRL Company", Master of Science Thesis, Jun. 1, 2005 (Jan. 1, 2005), IT-University Stockholm, Sweden Retrieved from the Internet: URL:https://people.kth.se/johanmon/theses/xiong.pdf [retrieved on Mar. 27, 2017] Chapters 2 and 3, pp. 1-79.

Jan De Clercp: "Single Sign-On Architectures" in: "Network and Parallel Computing", Jan. 1, 2002 (Jan. 1, 2002), Springer International Publishing, Cham 032548, ISSN: 0302-9743 ISBN: 978-3-642-19166-4 vol. 2437, pp. 40-58, DOI: 10.1007/3-540-45831-X_4, abstract Sections 2-5.

Extended European Search Report for 16196905.0 dated Apr. 4, 2017.

* cited by examiner

FIG.6

| COMMUNICATION ID | DESTINATION NAME | ACCOUNT STATE | OPERATION STATE |
|---|---|---|---|
| 01aa | GINZA OFFICE | VALID | ONLINE |
| 01ab | OHMORI OFFICE | VALID | ONLINE |
| 01ba | YAMADA TARO | VALID | OFFLINE |
| 02aa | (NON) | VALID | ONLINE |
| 02ab | (NON) | VALID | ONLINE |
| 02ba | (NON) | INVALID | OFFLINE |

FIG.7

| COMMUNICATION ID | PASSWORD |
|---|---|
| 01aa | aaaa |
| 01ab | abab |
| 01ba | baba |
| ⋮ | ⋮ |

FIG.8

| COMMUNICATION ID | AUTHENTICATION PROVIDER NAME | EXTERNAL ACCOUNT NAME |
|---|---|---|
| 01ba | AUTHENTICATION PROVIDER A | foo@A |
| 02aa | AUTHENTICATION PROVIDER A | hoge@A |
| 02ab | AUTHENTICATION PROVIDER B | moge |
| 02ba | AUTHENTICATION PROVIDER A | fuga@A |
| 02ba | AUTHENTICATION PROVIDER B | fuga |

FIG.9

| COMMUNICATION ID | DESTINATION NAME |
|---|---|
| 01aa | GINZA OFFICE |
| 01ba | foo@A (AUTHENTICATION PROVIDER A) |
| 02aa | hoge@A (AUTHENTICATION PROVIDER A) |
| 02ab | moge (AUTHENTICATION PROVIDER B) |

FIG.10

| AUTHENTICATION PROVIDER NAME | FORWARDING DESTINATION | AUTHENTICATION TOKEN REQUEST DESTINATION |
|---|---|---|
| AUTHENTICATION PROVIDER A | https://auth.a.com | https://token.a.com |
| AUTHENTICATION PROVIDER B | https://id.b.co.jp/auth | https://id.b.co.jp/token |

FIG.11

| REQUEST SOURCE COMMUNICATION ID | DESTINATION COMMUNICATION ID |
|---|---|
| 01aa | 01ab,01ba,01bb,01ca,01db, ⋯ |
| 01ab | 01aa,01ca,01cb |
| 01ba | 01aa,01ab,01ca,01cb,01da,01db |
| ⋮ | ⋮ |
| 01db | 01aa,01ab,01ba, ⋯ ,01da,01ca,01cb, ⋯ ,01da |
| ⋮ | ⋮ |

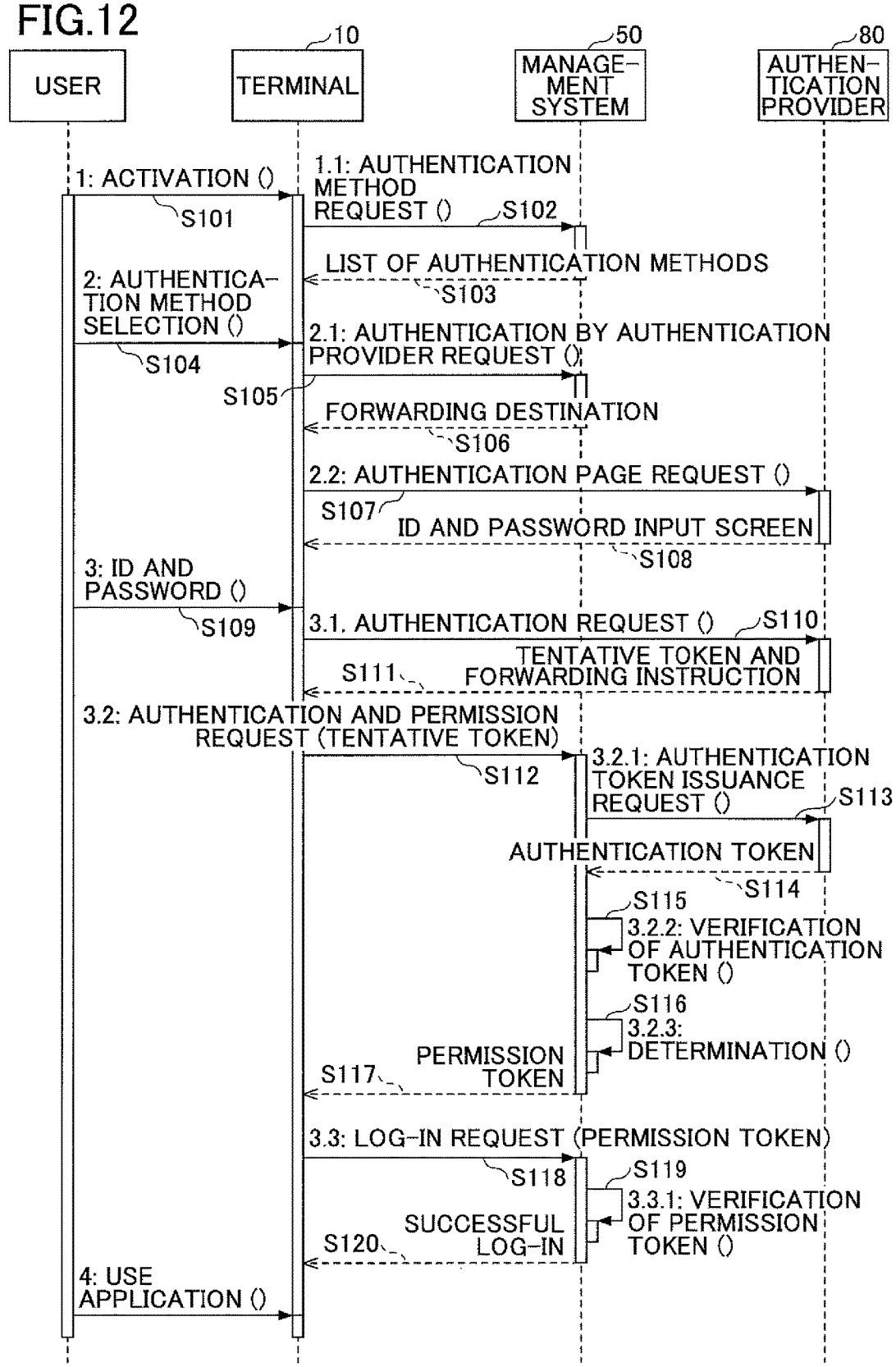

FIG.15

| FUNCTION ID | FUNCTION NAME | BASIC FUNCTION |
|---|---|---|
| F01 | CONTACT LIST MANAGEMENT | YES |
| F02 | TV CONFERENCE | NO |
| F03 | OTHER TYPE CONNECTION | NO |
| F04 | TRIAL TV CONFERENCE | YES |

FIG.16

| COMMUNICATION ID | FUNCTION ID | USAGE PERIOD |
|---|---|---|
| 01aa | F01 | 1970/01/01-9999/12/31 |
| 01aa | F02 | 1970/01/01-9999/12/31 |
| 01ab | F01 | 1970/01/01-9999/12/31 |
| 01ab | F02 | 1970/01/01-9999/12/31 |
| 01ab | F03 | 1970/01/01-9999/12/31 |
| 01ba | F01 | 1970/01/01-9999/12/31 |
| 01ba | F02 | 1970/01/01-9999/12/31 |
| 02aa | F01 | 1970/01/01-9999/12/31 |
| 02aa | F02 | 1970/01/01-9999/12/31 |
| 02ab | F01 | 1970/01/01-9999/12/31 |
| 02ab | F04 | 1970/01/01-2015/12/31 |
| 02ba | F01 | 1970/01/01-9999/12/31 |
| 02ba | F02 | 1970/01/01-2015/12/31 |

FIG.17

| AUTHENTICATION PROVIDER NAME | FUNCTION ID | USAGE PERIOD |
|---|---|---|
| AUTHENTICATION PROVIDER A | F01 | 1970/01/01-9999/12/31 |
| | F04 | 1970/01/01-2015/12/31 |
| AUTHENTICATION PROVIDER B | F01 | 1970/01/01-9999/12/31 |
| | F02 | 1970/01/01-2015/12/31 |

MANAGEMENT SYSTEM, MANAGEMENT METHOD, AND RECORDING MEDIUM FOR MANAGING USE OF FUNCTION TO TERMINAL

BACKGROUND OF THE INVENTION

1. Field of the Invention

The present disclosure relates to management systems, management methods, and recording media.

2. Description of the Related Art

Conference systems for holding remote conference between a plurality of places via a communication network such as the Internet and LAN (Local Area Network) become common.

In such conference systems, a technology is known, in which users who can use a service are managed by using account information including ID and password of the user.

RELATED ART DOCUMENT

Patent Document

[Patent Document 1]: Japanese Unexamined Patent Application Publication No. 2014-206922

SUMMARY OF THE INVENTION

An object of the present disclosure is to provide a technology for easily performing authentication of an account.

The following configuration is adopted to achieve the aforementioned object.

In one aspect of the embodiment of the present disclosure, there is provided a management system including, a reception unit configured to receive identification information for identifying an account, allocated by an authentication apparatus, corresponding to a terminal, the terminal being authenticated by the authentication apparatus, and a management unit configured to determine whether a function provided by the management system can be used by the terminal based on the identification information received by the reception unit.

Other objects, features, and advantages of the present disclosure will become apparent from the following detailed description when read in conjunction with the accompanying drawings.

BRIEF DESCRIPTION OF THE DRAWINGS

FIG. 6 is a diagram schematically illustrating a terminal management table.

FIG. 7 is a diagram schematically illustrating a terminal authentication management table.

FIG. 8 is a diagram schematically illustrating an external authentication terminal management table.

FIG. 9 is a diagram schematically illustrating a log-in account management table.

FIG. 10 is a diagram schematically illustrating an authentication provider management table.

FIG. 11 is a diagram schematically illustrating a contact list management table.

FIG. 12 is a diagram illustrating an example sequence of a process for delegating authentication to an authentication provider.

FIG. 15 is a diagram schematically illustrating a function management table.

FIG. 16 is a diagram schematically illustrating available function management table.

FIG. 17 is a diagram schematically illustrating a usage period management table.

DETAILED DESCRIPTION OF THE PREFERRED EMBODIMENTS

<General Arrangement>

Figure 1:
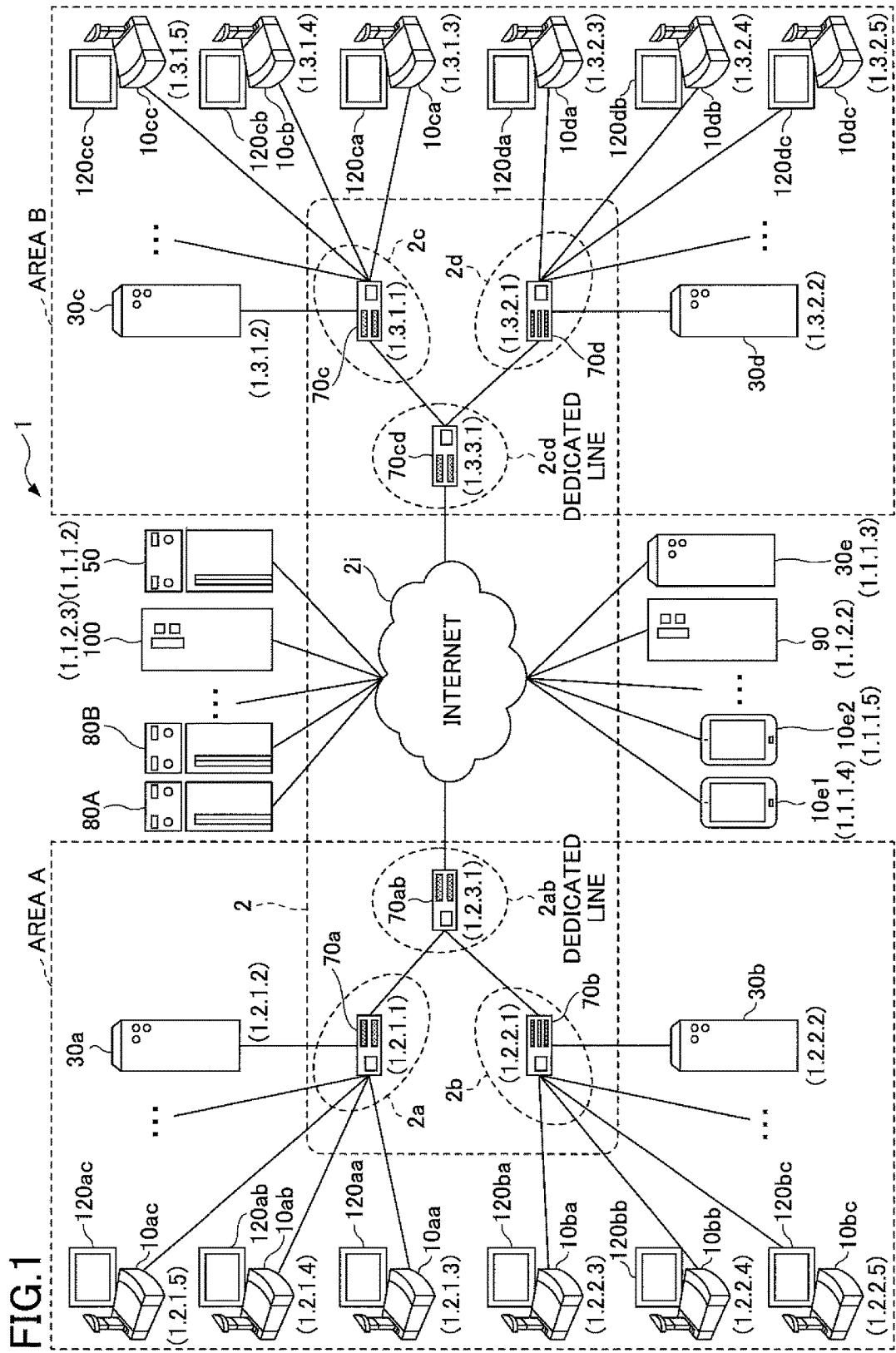
FIG. 1 is a diagram schematically illustrating a transmission system.

In the following, embodiments of the present disclosure will be described with reference to accompanying drawings. FIG. 1 is a diagram schematically illustrating an example transmission system 1 of the present embodiment.

The transmission system includes a data provision system for transmitting content data unidirectionally from one terminal to another terminal via a management system, and a communication system for transmitting information including emotion bidirectionally between a plurality of terminals via a management system. The transmission system is provided for transmitting information including emotion bidirectionally between a plurality of communication terminals (corresponding to "terminals") via a communication management system (corresponding to "management system"). A TV conference system, a video phone system, a voice conference system, a voice phone system, a personal computer (PC) screen sharing system can be exemplified as the transmission system.

The transmission system 1 illustrated in FIG. 1 includes a plurality of terminals 10*aa*, 10*ab*, etc., displays 120*aa*, 120*ab*, etc., for respective terminals 10*aa*, 10*ab*, etc., a plurality of relay apparatuses 30*a*, 30*b*, 30*c*, 30*d*, and 30*e*, a management system 50, an authentication provider 80A, 80B, etc., a program provision system 90, and a maintenance system 100.

Additionally, in the present embodiment, an arbitrary terminal among the terminals 10*aa*, 10*ab*, etc., is simply referred to as "terminal 10". An arbitrary display among the displays 120*aa*, 120*ab*, etc., is simply referred to as "display 120". An arbitrary relay apparatus among the relay apparatuses 30*a*, 30*b*, 30*c*, 30*d*, and 30*e* is simply referred to as "relay apparatus 30". An arbitrary authentication provider among the authentication providers 80A, 80B, etc., is simply referred to as "authentication provider 80".

In the present embodiment, the terminal 10 is authenticated by using an account allocated by the management system 50 or an external authentication provider 80. In a case where the terminal 10 is authenticated by using the account allocated by the authentication provider 80, the management system 50 determines whether an authority for using the service of the management system 50 is given to the account by using an ID link function e.g., OpenID Connect provided by the authentication provider 80. Additionally, SAML (Security Assertion Markup Language), OpenID2.0, etc., may be used as the ID link function. The authentication provider 80 and the management system 50 may be operated by the same company, etc., or may be operated by discrete companies. For example, GOOGLE ACCOUNTS, MICROSOFT AZURE ACTIVE DIRECTORY may be used as the authentication provider 80.

For example, the terminal 10 transmits/receives content data including image data and sound data after logged-in the management system 50. For example, the terminal 10 may be a terminal such as a smartphone, a notebook PC. In this case, the terminal 10 may be connected to the management system 50 via a transmission network including a mobile communication network, a wireless LAN, or the internet.

The relay apparatus 30 relays the image data and the sound data between the terminals 10.

The management system 50 manages the terminals 10 transmitting and receiving the content data. The management system 50 stores authentication information (communication ID and password) for the terminal 10 to log-in the transmission system 1, information of registered terminals that are communication destination with respect to every terminal 10, information related to a communication (session) using the terminal 10 and the relay apparatus 30, and the like. The information stored in the management system 50 will be described below in detail.

Also, a plurality of routers 70a, 70b, 70c, 70d, 70ab, and 70cd illustrated in FIG. 1 select an optimal transmission rout of the image data and the sound data. Additionally, in the present embodiment, an arbitrary router among the routers 70a, 70b, 70c, 70d, 70ab, and 70cd is referred to as "router 70".

A program provision system 90 includes a HD (hard disk) (not illustrated) having a program for the terminal to achieve respective functional units of the terminal 10 stored therein, and the program for the terminal can be transmitted to the terminal 10. Also, a program for the relay apparatus to achieve respective functional units of the relay apparatus 30 is stored in the HD of the program provision system 90, and the program for relay apparatus can be transmitted to the relay apparatus 30. Further, a transmission management program for the management system to achieve respective functional units of the management system 50 is stored in the HD of the program provision system 90, and the transmission management program can be transmitted to the management system 50.

The maintenance system 100 is a computer for performing maintenance or management of at least one of the terminal 10, the relay apparatus 30, the management system 50, and the program provision system 90. For example, in a case where the maintenance system 100 is disposed in domestic area while the terminal 10, the relay apparatus 30, the management system 50, or the program provision system 90 is disposed in foreign area, the maintenance system 100 performs remote maintenance or remote management of at least one of the terminal 10, the relay apparatus 30, the management system 50, and the program provision system 90 via a communication network 2. Also, the maintenance system 100 performs a maintenance operation such as a management of apparatus numbers, production numbers, sales destinations, maintenance checkups, failure histories regarding at least one of the terminal 10, the relay apparatus 30, the management system 50, and the program provision system 90 without passing through the communication network 2.

Also, the terminals 10aa, 10ab, etc., the relay apparatus 30a, and the router 70a are connected to a LAN 2a being capable of communicating each other. The terminals 10ba, 10bb, etc., the relay apparatus 30b, and the router 70b are connected to a LAN 2b being capable of communicating each other. Also, the LAN 2a and the LAN 2b are connected by a dedicated line 2ab including the router 70ab so as to be able to communicate with each other, and the LAN 2a and the LAN 2b are formed within an area A.

Meanwhile, the terminals 10ca, 10cb, etc., the relay apparatus 30c, and the router 70c are connected to a LAN 2c being capable of communicating each other. The terminals 10da, 10db, etc., the relay apparatus 30d, and the router 70d are connected to a LAN 2d being capable of communicating each other. Also, the LAN 2c and the LAN 2d are connected by a dedicated line 2cd including the router 70cd so as to be able to communicate with each other, and the LAN 2c and the LAN 2d are formed within an area B.

The terminals 10e1, 10e2, etc., are connected via the internet 2i being capable of communicating each other.

Also, the management system 50 and the program provision system 90 are connected with the terminal 10 and the relay apparatus 30 via the internet 2i being capable of communicating each other. The management system 50 and the program provision system 90 may be disposed in area A or area B, or may be disposed in another area.

Also, the relay apparatus 30e is connected with all of the terminals 10 included in the transmission system 1 being capable of communicating each other via the communication network 2. The relay apparatus 30e is in constant operation, and disposed in an area other than the areas A and B so that the relay apparatus 30e is unlikely to be affected by communication traffic of the areas A and B. Therefore, in a case where the terminal 10 communicates with a terminal disposed in another local area, the relay apparatus 30e is used for relaying communication data. Also, in a case where the terminals disposed in the same area communicate with each other and the relay apparatus disposed in the area is not operated, the relay apparatus 30e is used as an alternative relay apparatus.

Additionally, in the present embodiment, the LAN 2a, the LAN 2b, the dedicated line 2ab, the Internet 2i, the dedicated line 2cd, the LAN 2c, and the LAN 2d are included in the communication network 2. Not only wired communication but also wireless communication may be included in the communication network 2.

Also, in FIG. 1, four digits illustrated under respective terminals 10, respective relay apparatuses 30, the management system 50, respective routers 70, the program provision system 90, and the maintenance system 100 schematically indicate IP addresses of generic IPv4. For example, the IP address of the terminal 10aa is "1.2.1.3". Also, IPv6 may be used instead of IPv4. Here, descriptions are given with IPv4 for convenience of explanation.

<Hardware Configuration>

In the following a hardware configuration of the preset embodiment will be described.

Figure 2:
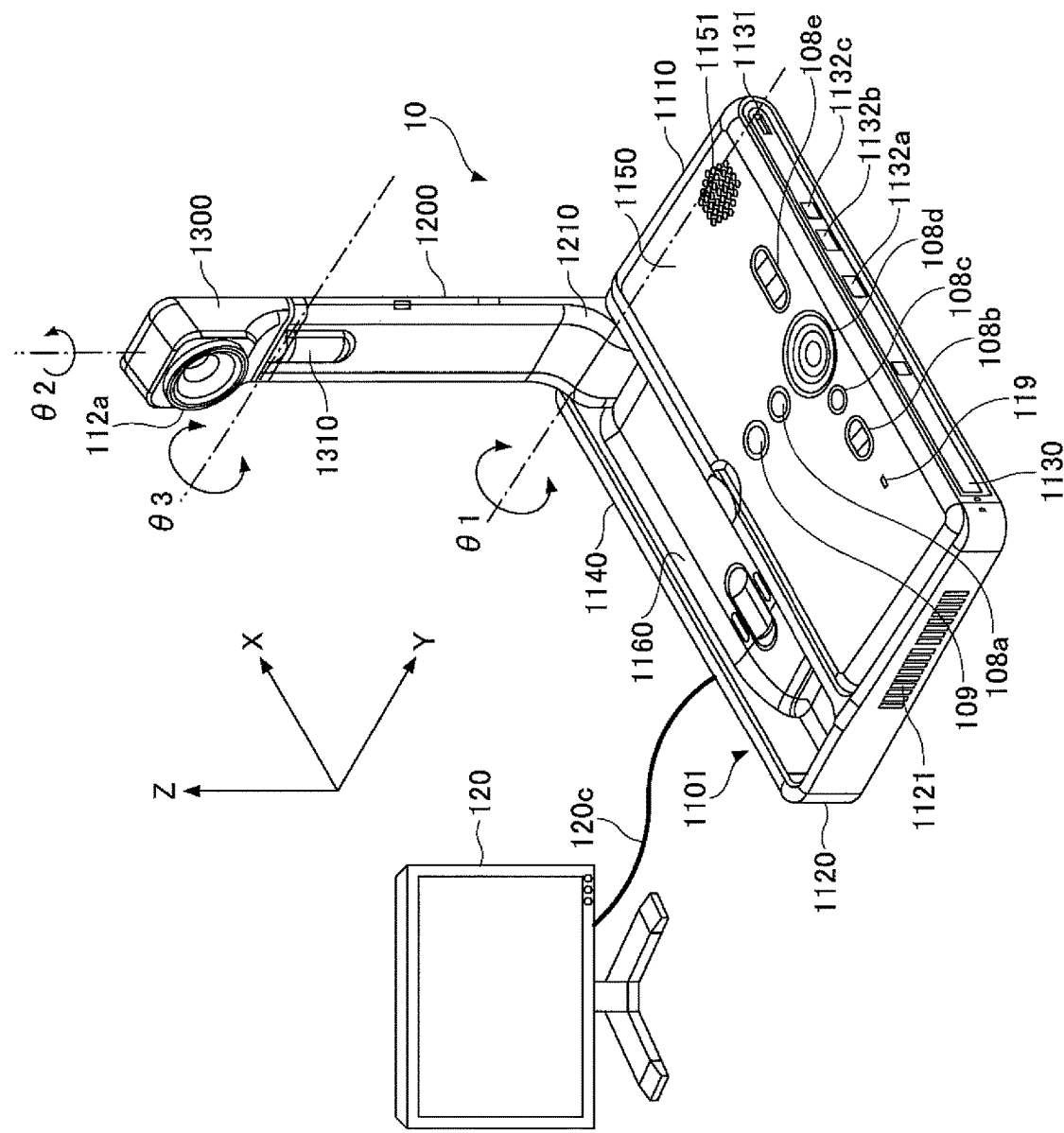
FIG. 2 is an example perspective view of a terminal.

FIG. 2 is an example perspective view of the terminal 10 of the present embodiment. In the following, a longitudinal direction of the terminal 10 corresponds to X axis, a direction orthogonal to the X axis in a horizontal plane corresponds to Y axis, and a direction (vertical direction) orthogonal to both X axis and Y axis corresponds to Z axis.

As illustrated in FIG. 2, the terminal 10 includes a chassis 1101, an arm 1200, and a camera housing 1300. In front wall surface 1110 of the chassis 1101, a plurality of intake holes are formed in intake surface, while in rear wall surface 1120 of the chassis 1101, a plurality of exhaust holes are formed in exhaust surface 1121. Thus, ambient air can be taken in through the intake surface by driving a cooling fan included in the chassis 1101 to be evacuated through the exhaust surface 1121 to rear side of the terminal 10. A built-in microphone 114a (described below) can collect voice, sound, noise, etc., through a sound collection hole 1131 formed in right wall surface 1130 of the chassis 1101.

An operational panel 1150 is formed in right wall surface 1130 side of the chassis 1101. A plurality of operational buttons 108a-108e, a power source switch 109, and an alarm lamp 119 (described below) are formed in the operational panel, and also sound emission surface 1151 in which a plurality of sound emission holes are formed for outputting sound from a built-in speaker 115a (described below) is formed in the operational panel 1150. Further, a concave accommodating portion 1160 for accommodating the arm 1200 and the camera housing 1300 are formed in left wall surface 1140 side of the chassis 1101. A plurality of connection holes 1132a-1132c for electrically connecting cables with an external device connection interface 118 (described below) are formed in right wall surface 1130 side of the chassis 1101. On the other hand, a connection hole for electrically connecting a cable 120c for a display 120 with the external device connection interface 118 (described below) is formed in left wall surface 1140 of the chassis 1101.

Additionally, in the following, an arbitrary button among the operational buttons 108a-108e is expressed as "operational button 108" and an arbitrary connection hole among the connection holes 1132a-1132c is expressed as "connection hole 1132".

The arm 1200 is attached onto the chassis 1101 through a torque hinge 1210 where the arm 1200 is rotatable in a vertical direction within tilt angle θ1 of 135° with respect to the chassis 1101. In FIG. 2, the arm 1200 is illustrated with its tilt angle θ1 of 90°.

A built-in camera 112a (described below) is included in the camera housing 1300, and images of a user, a document, a room, etc., can be captured with the built-in camera 112a. Also, a torque hinge 1310 is formed in the camera housing 1300. The camera housing 1300 is attached onto the arm 1200 through the torque hinge 1310. The camera housing 1300 is rotatable in horizontal direction within pan angle θ2 of ±180° and rotatable in vertical direction within tilt angle θ3 of ±45° with respect to the arm 1200, where the tilt and pan angle of the camera housing 1300 is 0° in FIG. 2.

Additionally, respective appearances of the relay apparatus 30, the management system 50, the program provision system 90, and the maintenance system 100 are not different from an appearance of a general server (computer), therefore the descriptions thereof are omitted.

Figure 3:
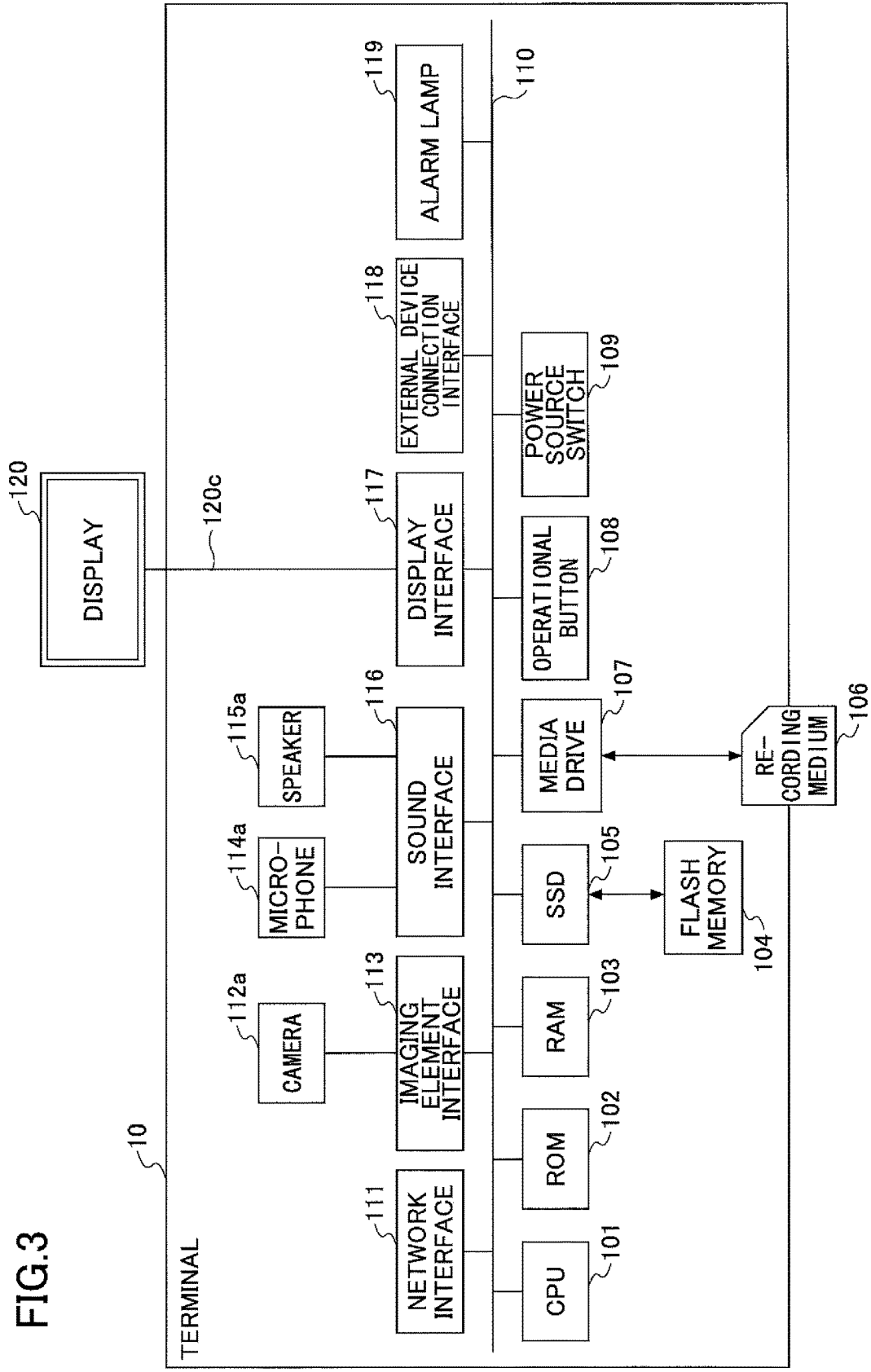
FIG. 3 is a block diagram illustrating a hardware configuration of the terminal.

FIG. 3 is a block diagram illustrating a hardware configuration of the terminal 10 of the present embodiment. As illustrated in FIG. 3, the terminal 10 includes a CPU (Central Processing Unit) 101 for controlling entire operation of the terminal 10, a ROM (Read Only Memory) 102 for storing the program for terminal, a RAM (Random Access Memory) 103 served as work area for the CPU 101, a flash memory 104 for storing data such as image data, or voice data, a SSD (Solid State Drive) 105 for controlling read/write of data from/in the flash memory 104 based on instructions of the CPU 101, a media interface 107 for controlling read/write of data from/in a recording medium 106 such as a flash memory, an operational button 108 operated when selecting a destination terminal, etc., a power source switch 109 for turning on/off power of the terminal 10, and a network interface 111 for transmitting data through the communication network 2.

Also, the terminal 10 includes a camera 112a for capturing image of an object to acquire image data under control of the CPU 101, an imaging element interface 113 for controlling capturing image by the camera 112a, a built-in speaker 115a for outputting sound, a sound interface 116 for collecting and outputting sound by the built-in microphone 114a and the built-in speaker 115a under control of the CPU 101, a display interface 117 for transmitting image data to an external display 120 under control of the CPU 101, an external device connection interface 118 for connecting external devices at the connection holes 1132a-1132c illustrated in FIG. 2, an alarm lamp 119 for informing abnormality in respective functions of the terminal 10, and a bus line 110 such as address bus or data bus for electrically connecting the respective elements as illustrated in FIG. 2.

The display 120 is a display unit for displaying images of an object, or images for inputting operations. A liquid crystal display or an Organic Electroluminescence display can be exemplified as the display 120. Also, the display 120 is connected to the display interface 117 by the cable 120c. The cable 120c may be a cable for analog RGB (VGA) signal, a cable for component video signal, a cable for HDMI (High-Definition Multimedia Interface), or a cable for DVI (Digital Video Interactive).

The camera 112a includes a lens, a solid state imaging element for converting light into electric charges to digitize the image of the object, where a CMOS (Complementary Metal Oxide Semiconductor), a CCD (Charge Coupled Device), etc., is used as the solid state imaging element.

An external camera, etc., can be connected to the external device connection interface 118 by a USB (Universal Serial Bus) cable or the like.

Additionally, the recording medium 106 is detachable to the terminal 10. Also, another nonvolatile memory in/from which data is written/read in accordance with the control of the CPU 101, such an EEPROM (Electrically Erasable and Programmable ROM) may be used instead of the flash memory 104.

Further, the program for terminal may be recorded in a computer readable recording medium such as the recording medium 106 in an installable or executable format so as to be distributed.

Figure 4:
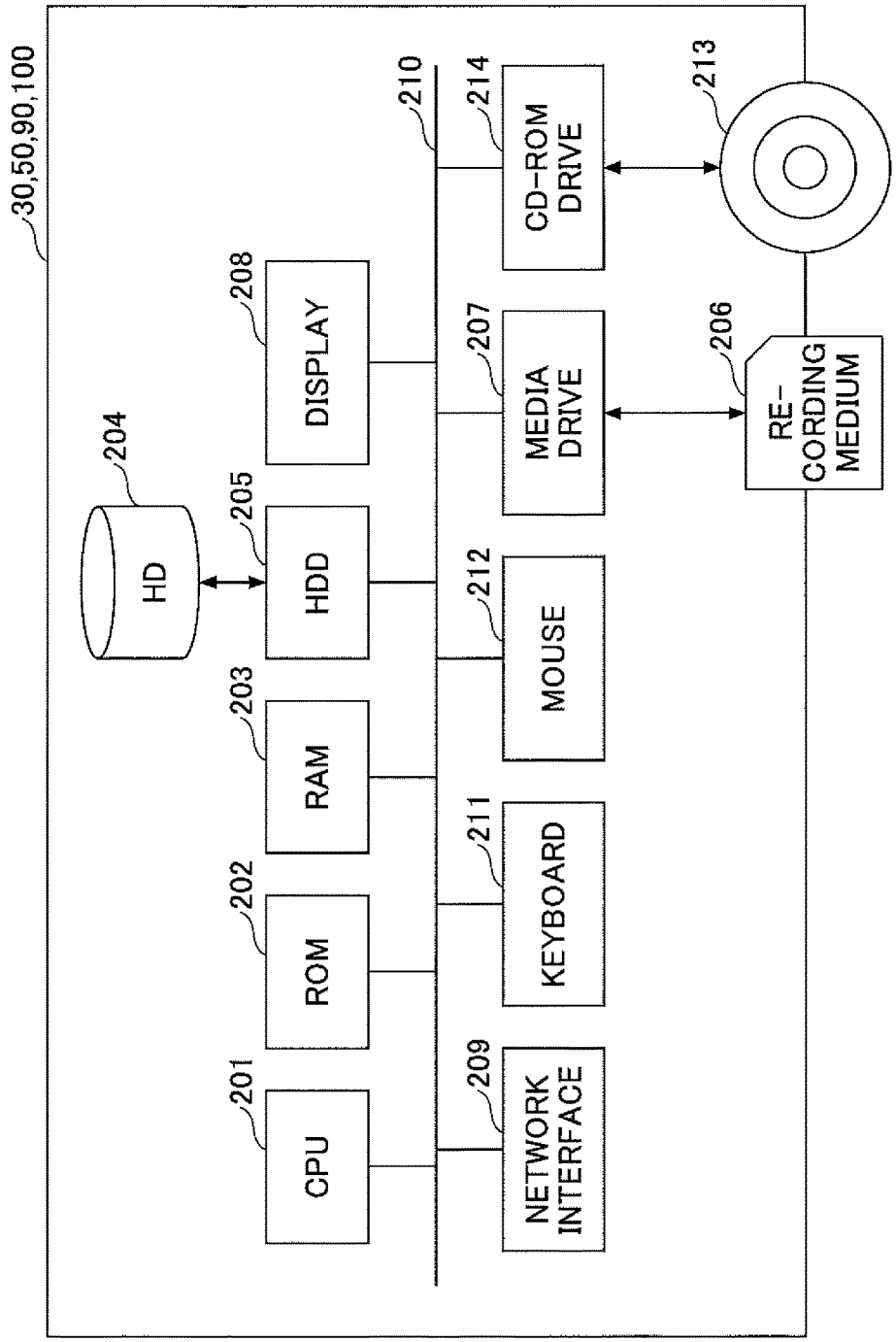
FIG. 4 is a block diagram illustrating a hardware configuration of the management system.

FIG. 4 is a block diagram illustrating a hardware configuration of the management system of an embodiment. The management system 50 includes a CPU (Central Processing Unit) 201 for controlling entire operation of the management system 50, a ROM 202 for storing a transmission management program, a RAM 203 served as a work area for the CPU 201, a HD 204 for storing data, a HDD (Hard Disk Drive) 205 for controlling read/write of data from/in the HD 204 based on instructions of the CPU 201, a media drive 207 for controlling read/write of data from/in a recording medium 206 such as a flash memory, a display 208 for displaying information such as a cursor, a menu, a window, characters, an image, etc., a network interface 209 for transmitting data through the communication network 2, a keyboard 211 including keys for inputting characters, numbers, instructions, etc., a mouse 212 for selecting or performing instructions, selecting an object to be processed and moving the cursor, a CD-ROM drive 214 for controlling read/write data from/in a CD-ROM (Compact Disc Read Only Memory) 213 which is an example of the detachable recording medium, and a bus line 210 such as address bus or data bus for electrically connecting the respective elements as illustrated in FIG. 4.

Additionally, the transmission management program may be recorded in a computer readable recording medium such as the recording medium 206 and CD-ROM 213 in an installable or executable format so as to be distributed.

Since the relay apparatus 30 has a similar hardware configuration to that of the management system 50, descriptions thereof are omitted. However, in the ROM 202 of the relay apparatus 30, the program for relay apparatus that is used for controlling the relay apparatus 30 is stored. Also, the program for relay apparatus may be recorded in a computer readable recording medium such as the recording medium 206 and CD-ROM 213 in an installable or executable format so as to be distributed.

Further, since the program provision system 90 has a similar hardware configuration to that of the management system 50, descriptions thereof are omitted. However, in the ROM 202 of the program provision system 90, the program provision program that is used for controlling the program provision system 90 is stored. Also, the program provision program may be recorded in a computer readable recording medium such as the recording medium 206 and CD-ROM 213 in an installable or executable format so as to be distributed.

Further, since the maintenance system 100 has a similar hardware configuration to that of the management system 50, descriptions thereof are omitted. However, in the ROM 202 of the maintenance system 100, the maintenance program that is used for controlling the maintenance system 100 is stored. Also, the maintenance program may be recorded in a computer readable recording medium such as the recording medium 206 and CD-ROM 213 in an installable or executable format so as to be distributed.

Additionally, a CD-R (Compact Disc Recordable), a DVD (Digital Versatile Disk, Blu-ray disc, etc., may be used as the computer readable recording medium.

<First Embodiment>

<Functional Configuration>

Figure 5:
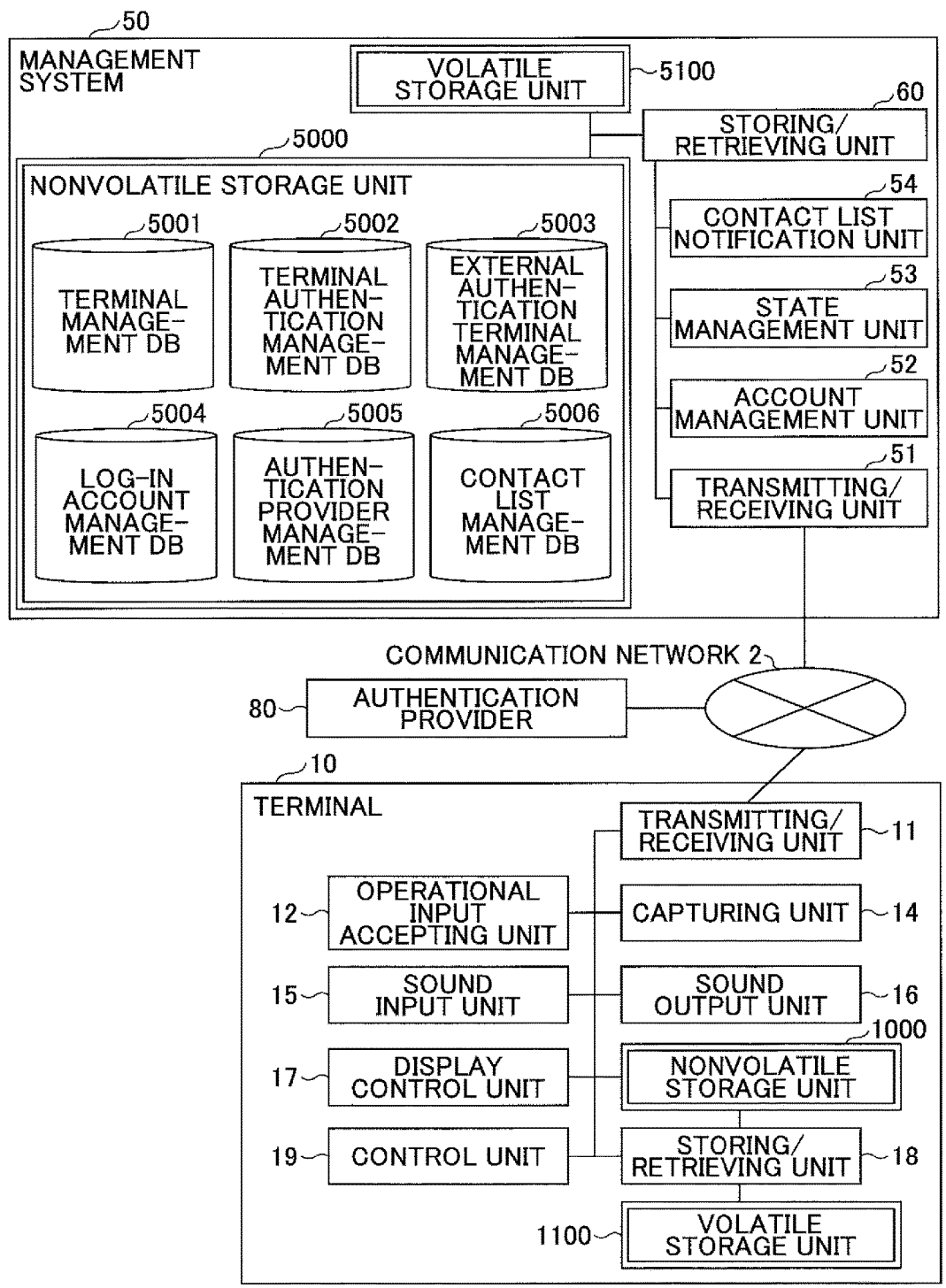
FIG. 5 is a block diagram illustrating functional configurations of terminal, apparatus, and system included in the transmission system of a first embodiment.

In the following, a functional configuration of the first embodiment will be described. FIG. 5 is a block diagram illustrating functional configurations of terminal, apparatus, and system included in the transmission system 1 of the first embodiment. In FIG. 5, the terminal 10, the management system 50, and the authentication provider 80 are connected via the communication network 2 so as to be capable of performing data communication. Also, in FIG. 5, the relay apparatus 30, the program provision system 90, the maintenance system 100, etc., illustrated in FIG. 1 are omitted because such apparatus and system are not directly related to account management of the terminal 10.

<Functional Configuration of Terminal>

The terminal 10 includes a transmitting/receiving unit 11, an operational input accepting unit 12, a capturing unit 14, a sound input unit 15, a sound output unit 16, a display control unit 17, a storing/retrieving unit 18, and a control unit 19. The respective functional units are achieved by operating any of the elements illustrated in FIG. 3 based on instructions from the CPU 101 according to programs retrieved from the ROM 102. Also, the terminal 10 includes a volatile storage unit 1100 achieved by the RAM 103 illustrated in FIG. 3, and a nonvolatile storage unit 1000 achieved by the flash memory 104 illustrated in FIG. 3.

<Functional Units of Terminal>

In the following, respective functional units of the terminal will be described.

The transmitting/receiving unit 11 is achieved by the network interface 111 illustrated in FIG. 3, and transmits/receives data to/from the terminal of a communication counterpart, apparatus, system, etc., through the communication network 2. The transmitting/receiving unit 11 starts to receive state information from the management system 50 before the communication with a destination terminal is started, where the state information indicates states of a terminal that is a destination candidate. Additionally, the state information indicates not only an operation state (online or offline) of the terminal 10 but also more detail information such as whether the terminal, which is in an online state, is busy or available. Also, the state information indicates not only the operation state of the terminal 10 but also various conditions such as a cable is detached from the terminal 10, sound output is allowed while image output is not allowed, sound is muted, and the like.

The operational input accepting unit 12 is achieved by the operational button 108 and the power source switch 109 illustrated in FIG. 3, and accepts input operations of the user. For example, upon the user turning on the power source switch 109 illustrated in FIG. 3, the operational input accepting unit 12 illustrated in FIG. 5 accepts power on operation input to power the terminal 10. Also, in response to accepting a selection input for selecting a destination terminal, the operational input accepting unit 12 requests the transmitting/receiving unit 11 to transmit communication start request information to the management system 50.

The capturing unit 14 is achieved by instructions from the CPU 101, the camera 112a, and the imaging element interface 113 illustrated in FIG. 3, and captures images to output the image data generated from the captured image. The sound input unit 15 is achieved by the sound interface 116 illustrated in FIG. 3, and inputs sound data generated from a sound signal converted from voice of the user input through the microphone 114a. The sound output unit 16 is achieved by instructions from the CPU 101 and the sound interface 116 illustrated in FIG. 3, and outputs the sound signal corresponding to the sound data so as to output sound from the speaker 115a.

The display control unit 17 is achieved by instructions from the CPU 101 illustrated in FIG. 3, and performs control for displaying image of the image data in the external display 120. For example, the display control unit 17 performs control for displaying a list of the destination terminals in the display 120.

The storing/retrieving unit 18 is achieved by instructions from the CPU 101 and e.g., the SSD 105 illustrated in FIG. 3, and performs processes for storing data in the nonvolatile storage unit 1000 and retrieving data from the nonvolatile storage unit 1000. In the nonvolatile storage unit 1000, communication IDs and passwords are stored. Further, the storing/retrieving unit 18 performs processes for storing data in the volatile storage unit 1100 and retrieving data from the volatile storage unit 1100.

The control unit 19 is achieved by instructions from the CPU 101 illustrated in FIG. 3, and performs controls of the terminal 10 described with reference to FIG. 12 by using the transmitting/receiving unit 11 and the display control unit 17. For example, the control unit 19 performs processes for requesting authentication method to the management system 50, displaying authentication method list received from the management system 50, accepting selection operations of the user for selecting the authentication method, and the like.

Additionally, the communication ID of the present embodiment means identification information for identifying the terminal 10. The identification information includes language, characters, marks, signs, and the like. Also, the terminal ID may be formed by combining at least two of the language, characters, marks, and signs.

<Functional Configuration of Management System>

In the following, functional configuration of the management system 50 will be described. First, information stored in the management system 50 will be described. The management system 50 includes a nonvolatile storage unit 5000 achieved by the HD 204 illustrated in FIG. 4, in which stored data is saved even if the management system 50 is powered off. Further, the management system 50 includes a volatile storage unit 5100 achieved by the RAM 203 illustrated in FIG. 4.

<Terminal Management Table>

A terminal management DB 5001 including a terminal management table illustrated in FIG. 6 is stored in the nonvolatile storage unit 5000. In the terminal management table, a destination name, an account state, and operation state are recorded with respect to every terminal 10 or every communication ID by which the terminal 10 can be identified, where the destination name is used when the user of the terminal 10 is the communication destination. For example, in the terminal management table illustrated in FIG. 6, as for the account whose communication ID is "01aa", the destination name is Ginza office and the account state is valid.

In the example illustrated in FIG. 6, accounts whose communication IDs are "01aa" and "01ab" correspond to a mobile terminal dedicated for a conference room. Therefore, the respective destination names thereof indicate a place. The account whose communication ID is "01bb" corresponds to a smartphone or personal computer owned by a private user, where a predetermined application programs are installed therein. Therefore, the destination name thereof indicates a private person's name.

Accounts whose communication IDs are "02aa", "02ab", and "02bb" are provided as external authorization accounts that are to be authorized by the authentication provider 80, and the destination names thereof should be acquired from the authentication provider 80. Therefore, destination names thereof are not recorded. Further, for example, the account whose communication ID is "02bb" is invalidated due to payment confirmation failure after the account is created. Therefore, the account state thereof is "invalid".

<Terminal Authentication Management Table>

Further, in the nonvolatile storage unit 5000, a terminal authentication management DB 5002 including a terminal authentication management table as illustrated in FIG. 7 is stored. In the terminal authentication management table, passwords for logging-in the transmission system 1 are recorded and associated with respective terminal 10 managed by the management system 50 on a communication ID-by-communication ID basis. For example, in the terminal authentication management table illustrated in FIG. 7, the communication ID of the terminal 10aa is "01aa", and the password is "aaaa". Information stored in the terminal authentication management table is recorded in advance by the user or administrator of the management system 50.

Additionally, among accounts managed in the terminal management table, accounts illustrated in FIG. 6, whose communication IDs are "02aa", "02ab", and "02bb", are provided for external authentication and to be authenticated by the authentication provider 80. Therefore, above described accounts are not managed in the terminal authentication management table.

<External Authentication Terminal Management Table>

Further, an external authentication terminal management DB 5003 including the external authentication terminal management table as illustrated in FIG. 8 is stored in the nonvolatile storage unit 5000. In the external authentication terminal management table, the authentication provider 80 by which the account is authenticated and an account name of the account allocated by the authentication provider 80 are recorded and associated with communication ID corresponding to the external authentication account that is to be authenticated by the authentication provider 80 on a communication ID-by-communication ID basis.

Additionally, the account whose communication ID is "01ba" is recorded in both the terminal authentication management table and the external authentication terminal management table. The account can be logged-in through any of authentication by the management system 50 and authentication by the authentication provider 80.

Also, a plurality of authentication providers 80 are associated with the communication ID "02ba". Therefore, the account corresponding to the communication ID "02ba" can be logged-in through any of authentication by the authentication providers 80 with which the communication ID "02ba" is associated.

For example, a right for using an account is purchased in advance so as to log-in the management system 50 with the account allocated by the authentication provider 80. And the account is recorded in the external authentication terminal management table in advance.

<Log-in Account Management Table>

Further, in the nonvolatile storage unit 5000, a log-in account management DB 5004 including a log-in account management table as illustrated in FIG. 9 is stored. In the log-in account management table, destination names of the accounts logging-in the transmission system 1 are recorded.

The destination name is updated, in the log-in account management table, in accordance with an authority by which the terminal 10 is authenticated when the terminal 10 logs-in the management system 50.

In the example illustrated in FIG. 9, the account whose communication ID is "01aa" is authenticated by the management system 50. The accounts whose communication IDs are "01ba" and "02aa" are authenticated by the authentication provider A. The account whose communication ID is "02ab" is authenticated by the authentication provider B.

<Authentication Provider Management Table>

Further, in the nonvolatile storage unit 5000, an authentication provider management DB 5005 including an authentication provider management table as illustrated in FIG. 10 is stored. In the authentication provider management table, an authentication provider name, a forwarding destination, and an authentication token request destination are recorded on an authentication provider-by-authentication provider basis, where the forwarding destination indicates an address to which a request of an authentication page of the authentication provider 80 is forwarded.

<Contact List Management Table>

Further, in the nonvolatile storage unit 5000, a contact list management DB 5006 including a contact list management table as illustrated in FIG. 11 is stored. In the contact list management table, a request source communication ID is associated with a destination communication ID and recorded on a request source communication ID-by-request source communication ID basis. The request source communication ID is information for identifying a request source terminal that requests for starting communication. The destination communication ID is information for identifying destination candidates that are candidates of destination terminal with respect to the request source terminal that requests for starting communication. The destination candidates are updated by being added or deleted in accordance with request of addition or deletion from the request source terminal to the management system 50. For example, in the contact list management table illustrated in FIG. 11, destination candidates of a TV conference communication with respect to request source terminal 10*aa* whose communication ID is "01aa" are the terminal 10*ab* whose communication ID is "01ab", the terminal 10*ba* whose communication ID is "01ba", the terminal 10*bb* whose communication ID is "01bb", the terminal 10*ca* whose communication ID is "01ca", and the terminal 10*db* whose communication ID is "01db".

<Functional Units of Management System>

In the following, functional units of the management system 50 will be described. Additionally, in the following, the functional units of the management system 50 will be described with elements illustrated in FIG. 4 which are required for achieving the functional units. The management system 50 includes a transmitting/receiving unit 51, an account management unit 52, a state management unit 53, a contact list notification unit 54, and a storing/retrieving unit 60. The respective units are achieved by operating any of elements illustrated in FIG. 4 based on instructions from the CPU 201 in accordance with the program stored in the ROM 202.

The transmitting/receiving unit 51 is achieved by the network interface 209 illustrated in FIG. 4, and performs transmission and reception of various data to/from other terminal, apparatus, or system via the communication network 2.

The state management unit 53 manages the operation states of the request source terminals that have logged-in the management system 50 such that the terminal name of the request source terminal, the operation state of the request source terminal, date and time at which the management system 50 receives log-in request information, and the IP address of the request source terminal are associated with the communication ID of the request source terminal and recorded in the terminal management table (see FIG. 6).

The state management unit 53 sets (changes) the state information of a terminal 10 in the terminal management table (FIG. 6) in response to receiving information indicating that the state of the terminal 10 has changed. For example, upon the user turning the power source switch 109 from off to on, the terminal 10 transmits the state information indicating that the terminal 10 is powered on to the management system 50. In response to receiving the state information via the transmitting/receiving unit 51, the state management unit 53 changes the operation state of the terminal 10 from "offline" to "online (available)" in the terminal management table (FIG. 6). Also, in response to the user turning the power source switch 109 from on to off, the terminal 10 transmits the state information indicating that the terminal 10 is powered off to the management system 50. In response to receiving the state information via the transmitting/receiving unit 51, the state management unit 53 changes the operation state of the terminal 10 from "online (available)" to "offline" in the terminal management table (FIG. 6).

In response to receiving information indicating a state change of the terminal 10 from the terminal 10, the state management unit 53 transmits the operation state after the change to respective terminals 10 whose destination includes the terminal 10. Thus, the operation state of the terminal 10 whose state has been changed is updated in a destination terminal list image displayed in the respective terminals 10.

Specifically, the state management unit 53 searches for the contact list management table (see FIG. 11) with the communication ID of the terminal 10 whose state has been changed as a search key to find a destination communication ID, thereby extracting terminals 10 whose contact list includes the terminal 10 whose state has been changed. Then, the operation state of the terminal 10 whose state has been changed is transmitted to the extracted terminals 10.

The contact list notification unit 54 searches for the contact list management table (see FIG. 11) with the communication ID of the request source terminal that has transmitted the log-in request as a search key to find a request source communication ID, thereby extracting destination communication IDs associated with the request source communication ID. The contact list notification unit 54 extracts terminals 10 identified by the extracted destination communication IDs as candidates of communication counterparts (destination candidates) with respect to the request source terminal.

The contact list notification unit 54 searches for the terminal management table (see FIG. 6) with the communication IDs of the destination candidates as search keys on a communication ID-by-communication ID basis, thereby retrieving the associated operation state. Thus, the contact list notification unit 54 can recognize the operation state of the destination candidate with respect to the request source terminal that has logged-in the management system 50.

The contact list notification unit 54 searches for the log-in account management table (see FIG. 9) with the communication ID of the destination candidate extracted by the contact list notification unit 54 as a search key, on a communication ID-by-communication ID basis, to retrieve the associated destination name. Thus, the contact list notification unit 54 can acquire the destination names of the destination candidates with respect to the request source terminal that has transmitted the log-in request.

The contact list notification unit 54 transmits a list of the communication IDs of the destination candidates, the destination names, and the operation states to the terminal 10.

The account management unit 52 performs an account management process for managing whether the terminal 10 can use functions of communication, contact list acquisition, etc., provided by the management system 50 based on the authentication result of the authentication provider 80.

For example, the account management unit 52 performs following processes in the account management process. The account management unit 52 receives the authentication result of the authentication provider 80 that has performed authentication on the terminal 10 from the terminal 10 via the transmitting/receiving unit 51. The account management unit 52 acquires the authentication token including identification information (account ID) for identifying an account of the terminal 10 allocated by the authentication provider 80 from the authentication provider 80 by using the authentication result.

The account management unit 52 determines whether the terminal 10 can use the functions of the management system 50 based on the account ID.

In a case where the terminal 10 can use the functions of the management system 50, the account management unit 52 transmits a communication ID (an example identification information for identifying an account in the management system 50) to the terminal 10, and receives the log-in request including the communication ID from the terminal 10. Thus, at least a part of processes of the management system 50 performed after receiving the log-in request from the terminal 10 can be communalized between cases where the terminal 10 is authenticated by the authentication provider 80 and where the terminal 10 is authenticated by the management system 50.

The storing/retrieving unit 60 performs processes for storing data in the nonvolatile storage unit 5000 or the volatile storage unit 5100, and for retrieving data from the nonvolatile storage unit 5000 or the volatile storage unit 5100.

<Process and Operation>

In the following, a processing method of the transmission system 1 of the present embodiment will be described.

First, a process of the transmission system 1 for delegating the authentication to the authentication provider will be described with reference to FIG. 12. FIG. 12 is a sequence diagram illustrating an example process for delegating the authentication to the authentication provider.

In response to accepting an activation operation from the user (step S101), the terminal 10 requests information indicating authentication method to the management system 50 (step S102).

The management system 50 transmits a list of the authentication method to the terminal 10 (step S103). Additionally, for example, in a case where the authentication providers A and B are recorded in the authentication provider management table of the management system 50, a list is transmitted, which includes three authentication methods of "authentication with transmission system account", "authentication with authentication provider A account", and "authentication with authentication provider B account"

The terminal 10 displays the transmitted list of the authentication methods to accept a selection operation of the authentication method input by the user (S104). In the following, descriptions are given in a case where the "authentication with authentication provider A account" or "authentication with authentication provider B account" is selected.

The terminal 10 transmits the selected authentication method to the management system 50 (step S105).

The management system 50 transmits the forwarding destination of the authentication provider A recorded in the authentication provider management table to the terminal 10 (step S106).

The terminal 10 is connected to the authentication provider A based on the forwarding destination (step S107).

The authentication provider A requests the terminal 10 to input ID and password (step S108).

The terminal 10 displays input screen for the ID and password, and accepts an input operation of the ID and password from the user (step S109). The terminal 10 transmits the input ID and password to the authentication provider A (step S110).

The authentication provider A performs an authentication based on the received ID and password. In a case of successful authentication, the authentication provider A transmits, to the terminal 10, a tentative token and a forwarding instruction to the management system 50 (S111).

The terminal 10 transmits the tentative token to the management system 50 to request authentication and permission (step S112).

The management system 50 transmits the tentative token to an address identified by authentication token issuance destination associated with the authentication provider A in the authentication provider management table (S113).

The authentication provider A transmits the authentication token to the management system 50 (step S114). Additionally, the authentication token includes information of the authentication provider itself, information related to the user such as a user ID, expiration date of the token, digital signature as an assurance of no manipulation, and the like.

The management system 50 checks the digital signature, the expiration date, etc., to determine whether the authentication token is valid (step S115).

In a case where the authentication token is valid, the management system 50 performs an account management process for determining whether the user of the terminal 10 can use the transmission system 1 (step S116). Additionally, detailed descriptions of the account management process will be given below.

Additionally, in a case where the communication ID is invalid (e.g., in a case where the communication ID does not exist or invalidated), the user of the terminal 10 is determined to have no authority for using the transmission system 1, thereby transmitting a response indicating an authentication failure to the terminal 10.

In a case where the communication ID is valid, the management system 50 issues a permission token to the terminal 10 (step S117). Additionally, the permission token includes the communication ID of the management system 50, information indicating permitted object/service (in this case, management system 50), expiration date of the token, digital signature as an assurance of no manipulation, and the like. In a case where the account is authenticated by the authentication provider 80, the permission token further includes an account ID of the account allocated by the authentication provider 80 and the authentication provider name.

The terminal 10 transmits a log-in request to the management system 50 by using the permission token (step S118).

The management system 50 verifies the permission token included in the log-in request (step S119), and transmits information indicating successful log-in to the terminal 10 (step S120).

Figure 13:
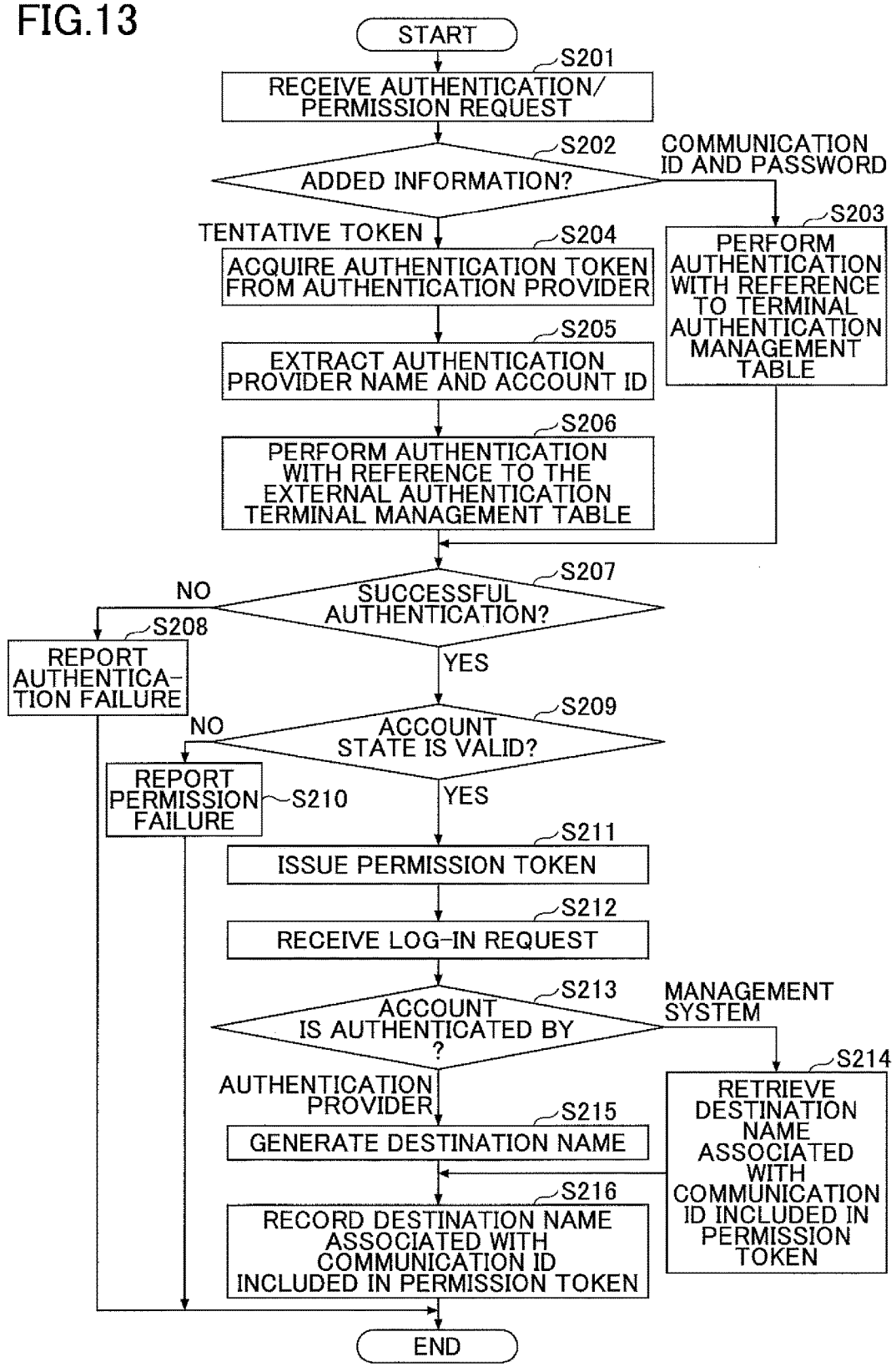
FIG. 13 is a flowchart illustrating an example account management process of a first embodiment.

In the following, steps S113, S115, S116, and S119 in FIG. 12, which correspond to detailed examples of the account management process performed by the account management unit 52 of the management system 50 will be described with reference to FIG. 13. FIG. 13 is a flowchart illustrating an example account management process of the first embodiment.

In response to receiving an authentication/permission request from the terminal (step S201), the account management unit 52 determines whether information added to the request is the tentative token or the communication ID and password (step S202).

In a case where the information added to the request is the communication ID and password, the authentication is performed based on a determination result of whether a combination of the communication ID and password is recorded in the terminal authentication management table (step S203). Then, the process is forwarded to step S207 described below.

In a case where the information added to the request is the tentative token, the authentication token is acquired from the authentication provider 80 by using the tentative token (step S204), and the authentication provider name and the account ID included in the authentication token are extracted (step S205). The authentication is performed based on a determination result of whether the authentication provider name and the communication ID corresponding to the account ID are recorded in the external authentication terminal management table (step S206).

The account management unit 52 determines whether the authentication successfully resulted (step S207). In a case of authentication failure (NO in step S207), the authentication failure is transmitted to the terminal 10 (step S208), and the process is terminated.

In a case of successful authentication (YES in step S207), the account management unit 52 determines whether the account corresponding to the communication ID is valid with reference to the terminal management table (step S209).

In a case where the account is invalid (NO in step S209), the permission failure is transmitted to the terminal 10 (step S210).

In a case where the account is valid (YES in step S209), the permission token is issued for the terminal 10 (step S211).

In response to receiving the log-in request from the terminal 10 (step S212), the account management unit 52 determines whether the account is authenticated by the management system 50 or authenticated by the authentication provider 80 based on the permission token included in the log-in request (step S213).

In a case where the account is authenticated by the management system 50, the destination name associated with the communication ID included in the permission token is retrieved from the terminal management table (step S214). Then, the process is forwarded to step S216 described below.

In a case where the account is authenticated by the authentication provider 80, a destination name including e.g., the account ID and the authentication provider name is generated based on the account ID and the authentication provider name of the authentication provider 80 included in the permission token (step S215).

The destination name is associated with the communication ID included in the permission token, and recorded in the log-in state management table (step S216).

As described above, according to the present embodiment, the management system 50 can perform the authentication of the account by using the authentication result of the account performed by the authentication provider 80.

<Second Embodiment>

In the first embodiment, the management system 50 determines whether the account is valid based on the state of the account recorded in the terminal management table.

In the second embodiment, the management system 50 determines whether the account is allowed to use the management system 50 on a function-by-function basis. In this case, even if the account is not registered in the management system 50 in advance, the account can use predetermined functions of the management system 50 by being authenticated by the authentication provider 80.

<Functional Configuration of Second Embodiment>

Figure 14:
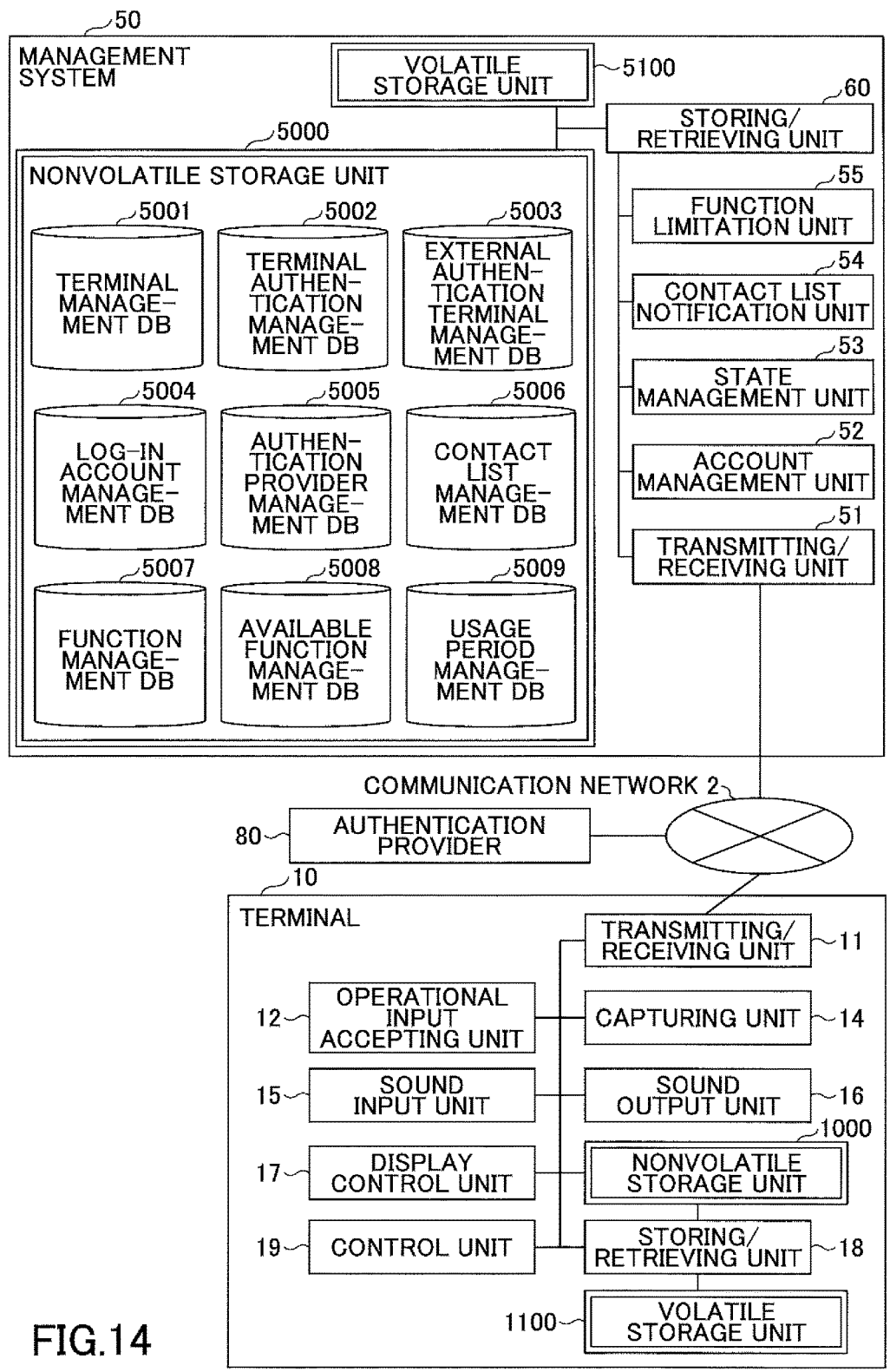
FIG. 14 is a block diagram illustrating terminals, apparatuses, and systems included in the transmission system of a second embodiment.

FIG. 14 is a block diagram illustrating terminals, apparatuses, and systems included in the transmission system of the second embodiment. In the management system 50 illustrated in FIG. 14, the management system 50 further includes a function limitation unit 55 in addition to the functional units illustrated in FIG. 5, and a function management DB 5007 and available function management DB 5008, and usage period management DB 5009 are stored in the nonvolatile storage unit 5000.

<Function Management Table>

The function management DB 5007 including a function management table as illustrated in FIG. 15 is stored in the nonvolatile storage unit 5000. In the function management table, a function ID for identifying the function, a function name, and a flag indicating whether basic function or not are recorded on a function ID-by-function ID basis. The basic function can be used even when the user logs-in with the account allocated by the authentication provider 80 without registering the account in the management system 50 in advance.

The "contact list management" illustrated in FIG. 15 is a function for managing a list of destination terminals with which TV conference communication can be performed. The "TV conference" is a function for performing TV conference by using the transmission system 1. The "other type connection" is a function for performing TV conference, for example, by connecting with another TV conference system made by other manufacture. The "trial TV conference" is a function for performing TV conference, for example, with a limitation such as low image/sound quality, or automatically terminated when a predetermined time (e.g., 15 minutes) passes.

Also, in the example illustrated in FIG. 15, "contact list management" and "trial TV conference" are set as the basic functions.

<Available Function Management Table>

In the nonvolatile storage unit 5000, an available function management DB 5008 including an available function management table illustrated in FIG. 16 is stored. In the available function management table, one or more function IDs of functions that can be used by an account corresponding to a communication ID and a period within which the function can be used (usage period) are associated with the communication ID and recorded.

In the example illustrated in FIG. 16, the account corresponding to the communication ID "01aa" can use functions corresponding to the function IDs "F01" and "F02" from 1970.01.01 to 9999.12.31, which means the usage period is unlimited.

Accounts corresponding to communication IDs "02ab" and "02ba" are example accounts allocated by the authentication provider 80 logging-in the management system 50 without registering the accounts in the management system 50 in advance. Function ID "F01" is not assigned to the account corresponding to the communication ID "02ab", instead, the function ID "F04" is assigned. Therefore, "TV conference" cannot be used while "trial TV conference" can be used.

For example, a user of the account corresponding to the communication ID "02ba" has logged-in the management system 50 during a campaign that is held with the authentication provider A. Therefore, the function ID "F01" is assigned and "TV conference" can be used. However, the usage period associated with the function ID "F01" is from 1970.01.01 to 2015.12.31, that is, the usage period is limited.

<Usage Period Management Table>

In the nonvolatile storage unit 5000, a usage period management DB 5009 including a usage period management table as illustrated in FIG. 17 is stored. In the usage period management table, the usage period set for every function ID is associated with the authentication provider name (authentication provider ID) of the authentication provider 80 and recorded.

The account management unit 52 of the second embodiment performs following processes in addition to the above-described account management process. The account management unit 52 determines whether the account ID of the authentication provider 80 corresponding to the terminal 10 is recorded in the external authentication terminal management table (FIG. 8). In a case where the account ID is not recorded in the external authentication terminal management table, the account management unit 52 sets function ID(s) of function chosen in accordance with the authentication provider 80 or function ID(s) of function that is defined as the basic function being associated with the communication ID of the terminal 10 in the available function management table (FIG. 16). Also, the account management unit 52 sets a usage period associated with the function ID in the available function management table (FIG. 16), where the usage period is defined in accordance with the authentication provider 80 or defined as a default usage period.

In response to receiving a function usage request requesting usage of function of the management system 50 such as "TV conference" from the terminal 10, the account management unit 52 determines whether the requested function can be used by the terminal 10 based on the available function management table. Specifically, the account management unit 52 checks the communication ID of the terminal 10 and the function ID of the function requested by the terminal 10 in the available function management table. If current time is within the usage period corresponding to the function ID, the account management unit 52 determines that the function can be used by the terminal 10. If current time is not within the usage period corresponding to the function ID, the function usage request is rejected.

For example, in a case where the account management unit 52 rejects the function usage request, the function limitation unit 55 transmits error information indicating the rejection of the function usage request to the terminal 10.

<Process Flow>

Figure 18:
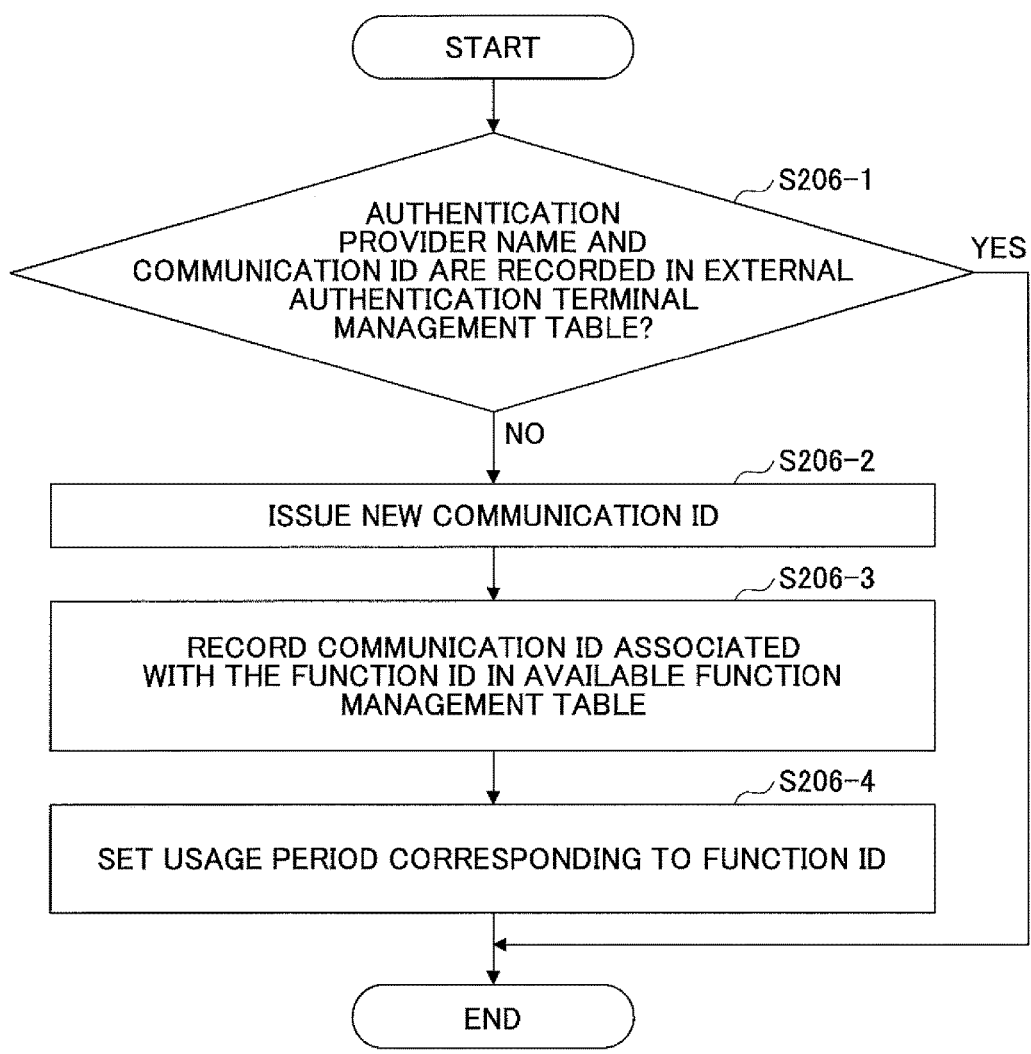
FIG. 18 is a flowchart illustrating an example account management process of the second embodiment.

FIG. 18 is a flowchart illustrating an example account management process of the second embodiment.

In the account management process of the second embodiment, a process illustrated in FIG. 18 is performed instead of the process of step S206 included in the account management process of the first embodiment illustrated in FIG. 13.

The account management unit 52 determines whether the authentication provider name and the communication ID corresponding to the account ID are recorded in the external authentication terminal management table (step S206-1).

In a case where the authentication provider name and the communication ID are recorded (YES in step S206-1), the process is terminated.

In a case where the authentication provider name and the communication ID are not recorded (NO in step S206), a new communication ID is issued (step S206-2). The issued communication ID, associated with the function ID, is recorded in the available function management table, where the function corresponding to the associated function ID is chosen in accordance with the authentication provider 80 that has allocated the account or set as the basic function and recorded in the usage period management table (step S206-3). Also, the usage period defined in accordance with the authentication provider 80 that has allocated the account, which is obtained from the usage period management table, is set being associated with respective function IDs in the available function management table (step S206-4). Additionally, in a case where the function ID of the basic function is recorded in the available function management table in step S206-3 and the usage period defined in accordance with the authentication provider 80 of the account and the function ID is not set in the usage period management table, the function ID may be deleted from the usage period management table or a default usage period may be set being associated with the function ID.

Additionally, the new communication ID issued in step S206-2 may be recorded in the terminal management table and the external authentication terminal management table.

<Supplementary Description of Embodiment>

The management system 50 and the program provision system 90 may be included in one computer or may be included in a plurality of computers separating their respective units (functions or means) to be disposed in the computers. Also, in a case where the program provision system 90 is included in one computer, the program sent from the program provision system 90 may be divided into a plurality of modules or may be not divided. Further, in a case where the program provision system 90 is included in a plurality of computers, the program may be sent from the computers being divided into a plurality of modules.

Also, the recording medium for storing the program for the terminal, the program for the relay apparatus, and the transmission management program, the HD 204 for storing these programs, and the program provision system 90 including the HD 204 for storing these programs are used, as program products, for providing users, etc., the program for the terminal, the program for the relay apparatus, and the transmission management program in Japan or a foreign country.

In the transmission system 1, the term "television conference" may be replaced with a term "video conference".

Although the description has been given where the television conference system is an example of the transmission system 1, this is not a limiting example. The transmission system 1 may be a communication system of an IP (Internet Protocol) phone, an Internet phone. Also, a car navigation system may be the transmission system 1. In this case, one of the terminals 10 is corresponds to the car navigation system installed in a car while the other of the terminals corresponds to a management terminal for managing the car navigation system in a management center or the car navigation system installed in another car. Further, the transmission system 1 may be a PC (Personal Computer) screen sharing system.

Herein above, although the present disclosure has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. The present application claims priority under 35 U.S.C. § 119 to Japanese Patent Application No. 2015-223160 filed on Nov. 13, 2015. The contents of which are incorporated herein by reference in their entirety.

What is claimed is:

1. A management system that communicates with a terminal and a plurality of authentication apparatuses for authenticating the terminal through a network, the management system comprising:
   a memory; and
   a processor coupled to the memory, and the processor configured to perform a process
   transmitting a list of multiple authentication methods used by one or more of authentication apparatuses and the management system;
   transmitting a forwarding instruction to an authentication apparatus corresponding to an authentication method upon receiving the authentication method selected at the terminal;

receiving, from the authentication apparatus, first identification information for identifying an account and second identification information for identifying the authentication apparatus, the account being allocated by the authentication apparatus and corresponding to a terminal, which is authenticated by the authentication apparatus;

permitting the terminal to use a function corresponding to the second identification information among functions provided by the management system based on the received second identification information, the terminal being specified by the first identification information and the second identification information; and transmitting third identification information for identifying an account that is allocated by the management system to the terminal upon a usage of the function that is determined as being allowed, wherein the third identification information is included in a log-in request transmitted from the terminal to the management system.

2. The management system according to claim 1, wherein the processor is further configured to transmit information including the first identification information to another terminal, wherein the terminal is recorded in a contact list indicative of one of more destinations provided for the other terminal, and the transmitted information is used as a destination name corresponding to the terminal.

3. The management system according to claim 1, wherein the processor is further configured to allow the terminal to use a function that is defined in accordance with the authentication apparatus having authenticated the terminal, in response to failing to find the first identification information.

4. The management system according to claim 1, wherein the processor is further configured to allow the terminal to use the function for a period defined in accordance with the authentication apparatus having authenticated the terminal, in response to failing to find the first identification information.

5. The management system as claimed in claim 1, wherein the processor permits the terminal to use the function corresponding to the authentication apparatus and a date and time when the function becomes available.

6. The management system as claimed in claim 1, wherein the first identification information is used to authenticate the terminal by the authentication apparatus.

7. The management system as claimed in claim 1, wherein the third identification information is used to authenticate the terminal by the management system.

8. A method for a management system that communicates with a terminal and a plurality of authentication apparatuses for authenticating the terminal through a network, the method comprising:

transmitting a list of multiple authentication methods used by one or more of authentication apparatuses and the management system;

transmitting a forwarding instruction to an authentication apparatus corresponding to an authentication method upon receiving the authentication method selected at the terminal;

receiving, from the authentication apparatus, first identification information for identifying an account and second identification information for identifying the authentication apparatus, the account being allocated by the authentication apparatus and corresponding to a terminal, which is authenticated by the authentication apparatus;

permitting the terminal to use a function corresponding to the second identification information among functions provided by the management system based on the received second identification information, the terminal being specified by the first identification information and the second identification information; and transmitting third identification information for identifying an account that is allocated by the management system to the terminal upon a usage of the function that is determined as being allowed, wherein the third identification information is included in a log-in request transmitted from the terminal to the management system.

9. The method as claimed in claim 8, wherein the terminal is permitted by the management system to use the function corresponding to the authentication apparatus and a date and time when the function becomes available.

10. The method as claimed in claim 8, wherein the first identification information is used to authenticate the terminal by the authentication apparatus.

11. The method as claimed in claim 8, wherein the third identification information is used to authenticate the terminal by the management system.

12. A non-transitory recording medium having stored therein a program for causing a computer serving as a management system that communicates with a terminal and a plurality of authentication apparatuses for authenticating the terminal through a network, to perform a process comprising:

transmitting a list of multiple authentication methods used by one or more of authentication apparatuses and the management system;

transmitting a forwarding instruction to an authentication apparatus corresponding to an authentication method upon receiving the authentication method selected at the terminal;

receiving, from the authentication apparatus, first identification information for identifying an account and second identification information for identifying the authentication apparatus, the account being allocated by the authentication apparatus and corresponding to a terminal, which is authenticated by the authentication apparatus;

permitting the terminal to use a function corresponding to the second identification information among functions provided by the management system based on the received second identification information, the terminal being specified by the first identification information and the second identification information; and transmitting third identification information for identifying an account that is allocated by the management system to the terminal upon a usage of the function that is determined as being allowed, wherein the third identification information is included in a log-in request transmitted from the terminal to the management system.

13. The non-transitory recording medium as claimed in claim 12, wherein the process permits the terminal to use the function corresponding to the authentication apparatus and a date and time when the function becomes available.

14. The non-transitory recording medium as claimed in claim 12, wherein the first identification information is used to authenticate the terminal by the authentication apparatus.

* * * * *